United States Patent
Horng et al.

(10) Patent No.: US 6,993,779 B2
(45) Date of Patent: Jan. 31, 2006

(54) POSITIONING STRUCTURE OF A CLAMPING DEVICE OF A DISC CARRIER ASSEMBLY

(75) Inventors: Alex Horng, Kaohsiung (TW); Yin-Rong Hong, Kaohsiung (TW)

(73) Assignee: Sunonwealth Electric Machine Industry Co., Ltd., Kaohsiung (TW)

(*) Notice: Subject to any disclaimer, the term of this patent is extended or adjusted under 35 U.S.C. 154(b) by 167 days.

(21) Appl. No.: 10/621,514

(22) Filed: Jul. 18, 2003

(65) Prior Publication Data
US 2004/0244024 A1    Dec. 2, 2004

(51) Int. Cl.
G11B 17/028    (2006.01)
G11B 17/03    (2006.01)
G11B 19/20    (2006.01)

(52) U.S. Cl. ..................................... 720/695
(58) Field of Classification Search ............... 720/695, 720/658, 706, 707, 709; 369/270, 270.1, 369/263.1
See application file for complete search history.

(56) References Cited

U.S. PATENT DOCUMENTS 6,272,104 B1 * 8/2001 Liao et al. .................. 720/709
6,845,512 B2 * 1/2005 Horng et al. ............... 720/707

FOREIGN PATENT DOCUMENTS

JP    56-137560    * 10/1981

* cited by examiner

Primary Examiner—Julie Anne Watko
(74) Attorney, Agent, or Firm—Bacon & Thomas, PLLC

(57) ABSTRACT

A disc carrier assembly for an optical disc drive includes a disc carrier having an axial tube, a clamping device, and a positioning sleeve. The clamping device includes a central hole and plural clamping members for clamping an optical disc. The axial tube of the disc carrier is extended through the central hole of the clamping device. The positioning sleeve is securely sandwiched between an inner periphery delimiting the central hole of the clamping device and the axial tube. The positioning sleeve includes a flange for engaging with the clamping device to prevent the clamping device from disengaging from the disc carrier.

6 Claims, 4 Drawing Sheets

POSITIONING STRUCTURE OF A CLAMPING DEVICE OF A DISC CARRIER ASSEMBLY

BACKGROUND OF THE INVENTION

1. Field of the Invention

The present invention relates to a positioning structure of a clamping device of a disc carrier assembly for an optical disc drive. In particular, the present invention relates to a positioning structure of a clamping device of a disc carrier assembly for an optical disc drive that prevents inadvertent disengagement of the clamping device.

2. Description of Related Art

FIGS. 1 and 2 of the drawings illustrate an optical disc drive with a conventional disc carrier. The optical disc drive comprises a spindle motor including a disc carrier 10, a clamping device 20, a shaft 30, a stator assembly 40, a bearing seat 50, and a base 60. The disc carrier 10 is a rotor of the spindle motor and includes an engaging portion 11 that has an axial tube 111 with an axial hole 112. The clamping device 20 includes a central hole 21, plural clamping members 22, and plural elastic elements 23.

An outer periphery of the shaft 30 is tightly fitted to an inner periphery of the axial hole 112 of the axial tube 111, and the inner periphery of the central hole 21 of the clamping device 20 is tightly fitted around an outer periphery of the axial tube 111. The disc carrier 10 and the clamping device 20 are coupled by the shaft 30 to the stator assembly 40, the bearing seat 50, and the base 60 to thereby form a spindle motor for an optical disc drive. An optical disc can be releasably clamped by the clamping members 22 of the clamping device 20, and the data stored in the optical disc can be read through stable rotation of the disc carrier.

Although the tight fitting between the disc carrier 10 and the clamping device 20 simplifies and shortens the assembling procedure of the spindle motor, the clamping device 20 that is usually made of plastic provides a relatively low tolerance to deformation when compared with metal. In particular, the inner periphery of the central hole 21 of the plastic clamping device 20 fails to provide a sufficient engaging force after engagement with the outer periphery of the axial tube 111 of the metal engaging portion 11. Due to insufficient engaging force and unstable assembly between the inner periphery of the central hole 21 of the plastic clamping device 20 and the outer periphery of the metal axial tube 111, the clamping device 20 might be undesirably disengaged from the axial tube 111 of the carrier disc 10 while removing the optical disc from the clamping members 22 of the clamping device 20.

OBJECTS OF THE INVENTION

An object of the present invention is to provide a positioning structure of a clamping device of a disc carrier assembly for an optical disc drive that prevents inadvertent disengagement of the clamping device while removing an optical disc from the clamping device.

Another object of the present invention is to provide a positioning structure of a clamping device of a disc carrier assembly for an optical disc drive that provides reliable positioning of the clamping device.

SUMMARY OF THE INVENTION

To achieve the aforementioned objects, the present invention provides a disc carrier assembly for an optical disc drive. The disc carrier assembly includes a disc carrier having an axial tube, a clamping device, and a positioning sleeve. The clamping device includes a central hole and plural clamping members for clamping an optical disc. The axial tube of the disc carrier is extended through the central hole of the clamping device. The positioning sleeve is securely sandwiched between an inner periphery delimiting the central hole of the clamping device and the axial tube. The positioning sleeve includes a flange for engaging with the clamping device to prevent the clamping device from disengaging from the disc carrier.

In an embodiment of the invention, the positioning sleeve is made of metal or alloy. Further, the positioning sleeve has an inner periphery tightly engaged with the axial tube of the disc carrier. The positioning sleeve further has an outer periphery tightly engaged with the inner periphery delimiting the central hole of the clamping device.

The central hole of the clamping device includes a stepped portion in which the flange of the positioning sleeve is engaged, thereby preventing the clamping device from disengaging from the disc carrier. The flange of the positioning sleeve is one of triangular, square, polygonal, and toothed, and the stepped portion of the central hole of the clamping device is complimentary to the flange in shape.

Other objects, advantages and novel features of this invention will become more apparent from the following detailed description when taken in conjunction with the accompanying drawings.

DETAILED DESCRIPTION OF THE PREFERRED EMBODIMENT

Figure 1:
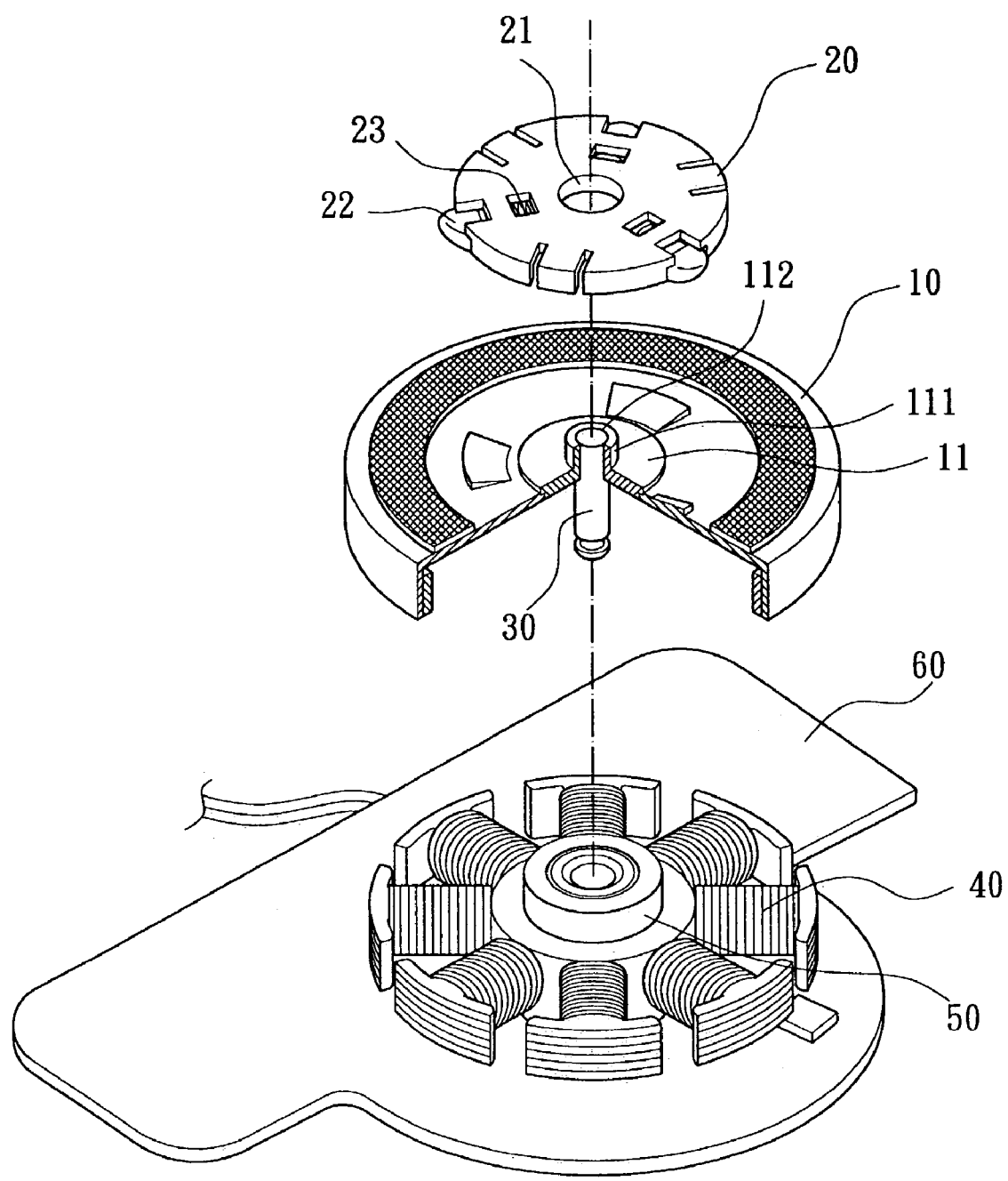
FIG. 1 is an exploded perspective view of an optical disc drive with a conventional disc carrier.
Figure 2:
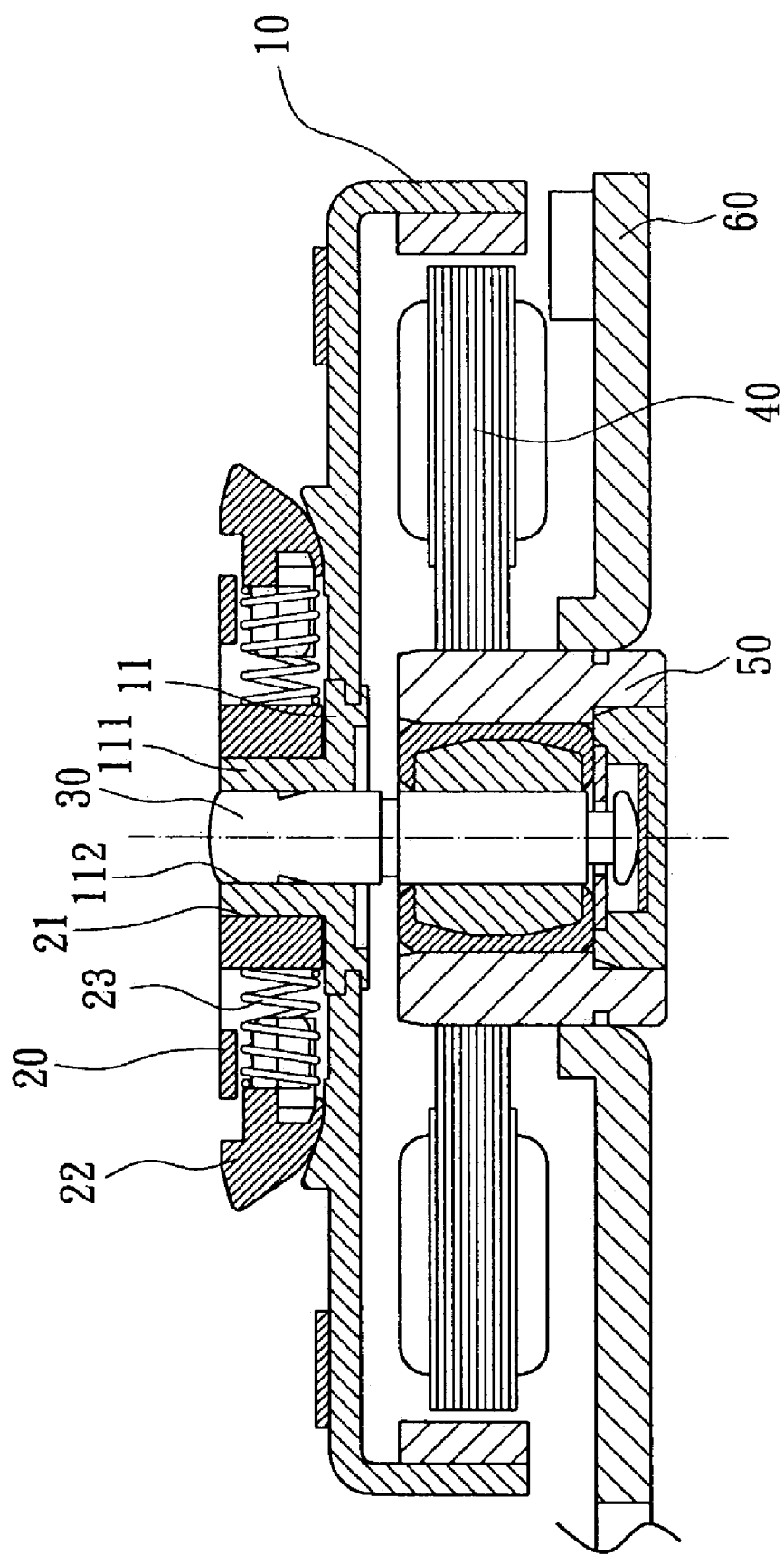
FIG. 2 is a sectional view of the optical disc drive in FIG. 1.

A preferred embodiment of the present invention is now to be described hereinafter in detail, in which the same reference numerals are used in the preferred embodiments for the same parts as those in the prior art to avoid redundant description.

Figure 3:
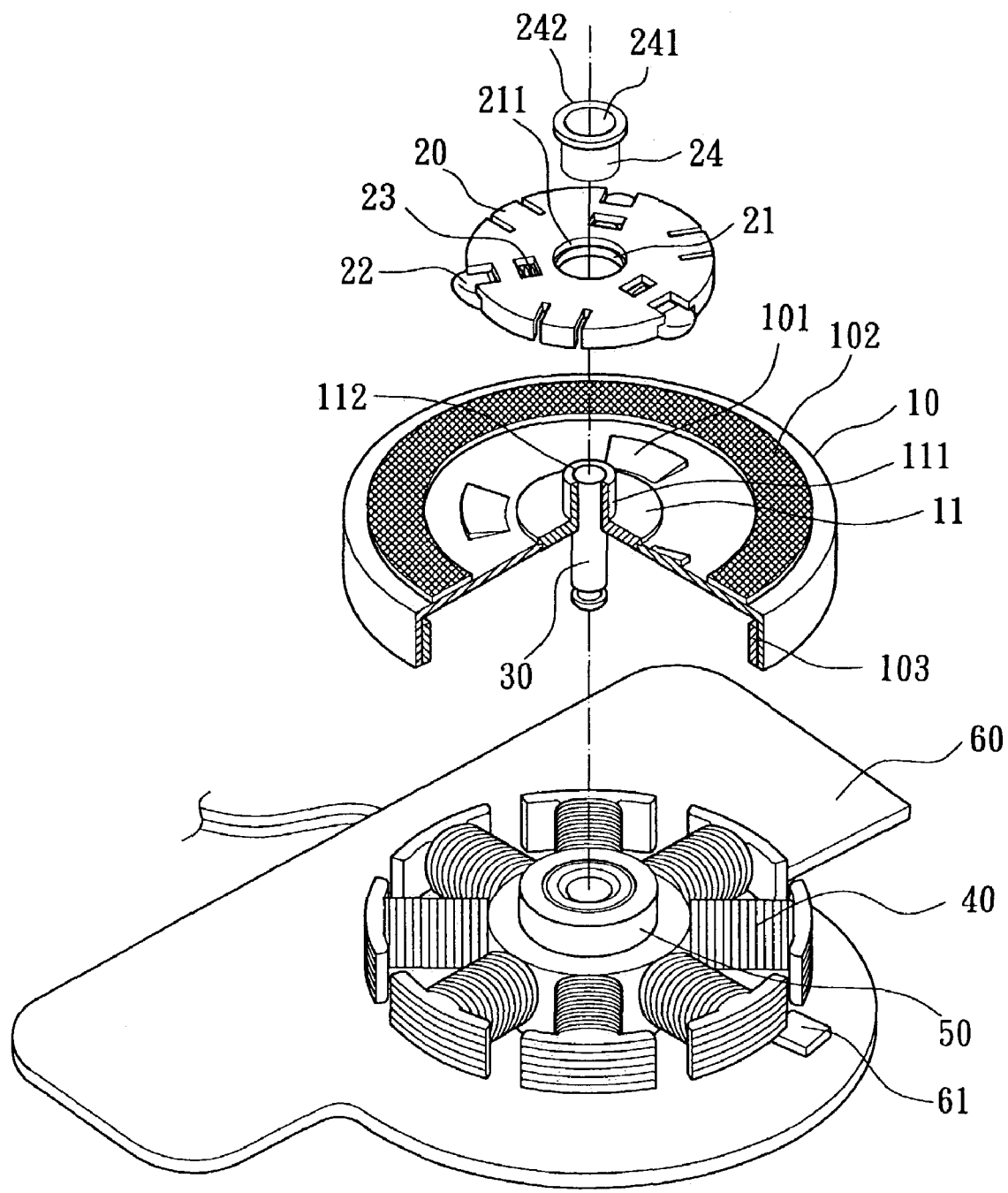
FIG. 3 is an exploded perspective view of an optical disc drive with a disc carrier in accordance with the present invention.
Figure 4:
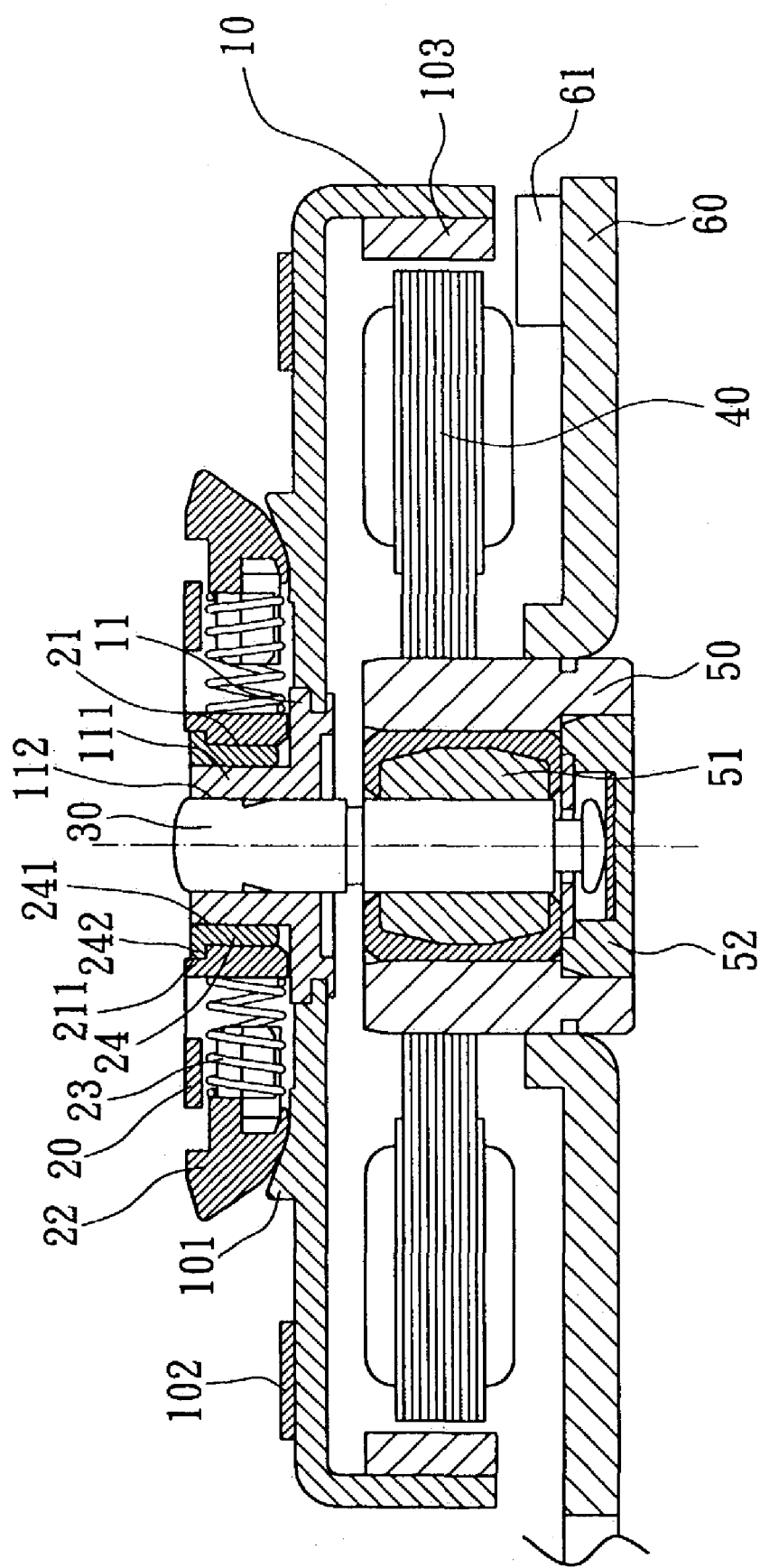
FIG. 4 is a sectional view of the optical disc drive in FIG. 3.

Referring to FIGS. 3 and 4, a disc carrier assembly in accordance with the present invention comprises a disc carrier 10, a clamping device 20, and a positioning sleeve 24. The disc carrier 10 is generally a rotor of a spindle motor and includes an engaging portion 11, a plurality of support blocks 101 on a top side thereof, and a ring magnet 103 mounted to an inner periphery of a skirt portion thereof The engaging portion 11 is made of metal or alloy and may be provided in a central portion of the disc carrier 10 by means of punching or integral formation. The engaging portion 11 includes an axial tube 111 extending along a longitudinal axis and having an axial hole 112. A shaft 30 is extended through the axial hole 112.

The positioning sleeve 24 is made of metal and mounted between the axial tube 111 and an inner periphery delimiting the central hole 21 of the clamping device 20. The positioning sleeve 24 includes a through-hole 241 and a flange 242 that is engaged in the stepped portion 211 of the central hole 21 of the clamping device 20.

As illustrated in FIG. 4, an inner periphery delimiting the through-hole 241 of the positioning sleeve 24 is tightly engaged with an outer periphery of the axial tube 111, and an outer periphery of the positioning sleeve 24 is tightly engaged with an inner periphery delimiting the central hole 21 of the clamping device 20, with the flange 242 of the positioning sleeve 24 being engaged in the stepped portion 211 of the central hole 21 of the clamping device 20.

The stepped portion 211 of the central hole 21 of the clamping device 20 can be omitted. In this case, the flange 242 of the positioning sleeve 24 abuts against a side of the clamping device 20. The flange 242 of the positioning sleeve 24 that is engaged in the stepped portion 211 of the central hole 21 of the clamping device 20 or abuts against a side of the clamping device 20 prevents the clamping device 20 from inadvertently disengaging from the disc carrier 10.

The flange 242 of the positioning sleeve 24 may be triangular, square, polygonal, or toothed, and the stepped portion 211 of the central hole 21 of the clamping device 20 is complimentary to the flange 242 in shape.

Still referring to FIGS. 3 and 4, after assembly of the disc carrier 10, the clamping device 20, the positioning sleeve 24, and the shaft 30, these elements can be assembled with a stator assembly 40, a bearing seat 50, and a base 60 to form a spindle motor for an optical disc drive. The bearing seat 50 includes a bearing 51 through which the shaft 30 is rotatably extended. The stator assembly 40 is mounted around the bearing seat 50 and generates alternating magnetic fields when energized. The bearing seat 50 is fixed to the base 60 on which a sensor 61 is mounted for detecting a change in polarity of the ring magnet 103 on the disc carrier 10. A support member 52 is mounted in the bearing seat 50 for supporting a distal end of the shaft 30. Further, a padding member 102 made of soft rubber may be mounted on the disc carrier 10 for supporting the optical disc and for absorbing vibrations of the optical disc.

When the above elements are assembled to form a spindle motor, the positioning sleeve 24 with a flange 242 reliably retains the clamping device 20 on the disc carrier 10, thereby preventing the clamping device 20 from disengaging from the disc carrier 10 while removing the optical disc from the clamping device 20.

While the principles of this invention have been disclosed in connection with its specific embodiment, it should be understood by those skilled in the art that these descriptions are not intended to limit the scope of the invention, and that any modification and variation without departing the spirit of the invention is intended to be covered by the scope of this invention defined only by the appended claims.

What is claimed is:

1. A disc carrier assembly for an optical disc drive, the disc carrier assembly comprising:
   a disc carrier having an axial tube;
   a clamping device including a central hole and plural clamping members for clamping an optical disc, the axial tube of the disc carrier being extended through the central hole of the clamping device; and
   a positioning sleeve securely sandwiched between an inner periphery delimiting the central hole of the clamping device and the axial tube, the positioning sleeve including a flange for engaging with the clamping device to prevent the clamping device from disengaging from the disc carrier.

2. The disc carrier assembly for an optical disc drive as claimed in claim 1, wherein the positioning sleeve is made of one of metal and alloy, the positioning sleeve having an inner periphery tightly engaged with the axial tube of the disc carrier, the positioning sleeve further having an outer periphery tightly engaged with the inner periphery delimiting the central hole of the clamping device.

3. The disc carrier assembly for an optical disc drive as claimed in claim 1, wherein the central hole of the clamping device includes a stepped portion in which the flange of the positioning sleeve is engaged, thereby preventing the clamping device from disengaging from the disc carrier.

4. The disc carrier assembly for an optical disc drive as claimed in claim 3, wherein the flange of the positioning sleeve is one of triangular, square, polygonal, and toothed, and wherein the stepped portion of the central hole of the clamping device is complimentary to the flange in shape.

5. The disc carrier assembly for an optical disc drive as claimed in claim 1, wherein the axial tube of the carrier includes an axial hole through which a shaft of a spindle motor extends.

6. The disc carrier assembly for an optical disc drive as claimed in claim 1, wherein the clamping device further includes plural elastic elements for biasing the clamping members to clamp the optical disc.

* * * * *